(12) United States Patent
Fujino

(10) Patent No.: US 7,068,494 B2
(45) Date of Patent: Jun. 27, 2006

(54) ELECTRIC DOUBLE LAYER CAPACITOR

(75) Inventor: Takeshi Fujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/151,266

(22) Filed: Jun. 14, 2005

(65) Prior Publication Data

US 2005/0276003 A1    Dec. 15, 2005

(30) Foreign Application Priority Data

Jun. 15, 2004   (JP) .............................. 2004-176690

(51) Int. Cl.
*H01G 9/00* (2006.01)
*H01G 9/04* (2006.01)

(52) U.S. Cl. .................. 361/502; 361/503; 361/508

(58) Field of Classification Search ........ 361/502–503, 361/508
See application file for complete search history.

(56) References Cited

U.S. PATENT DOCUMENTS

| 5,953,204 | A | * | 9/1999 | Suhara et al. ................ 361/502 |
| 6,882,517 | B1 | * | 4/2005 | Tano et al. .................. 361/502 |
| 2002/0057549 | A1 | * | 5/2002 | Oyama et al. .............. 361/303 |
| 2003/0026753 | A1 | * | 2/2003 | Fujino et al. ............ 423/445 R |
| 2003/0179537 | A1 | * | 9/2003 | Tanaka et al. ............... 361/502 |

FOREIGN PATENT DOCUMENTS

| JP | 61-203614 A | 9/1986 |
| JP | 01-139865 A | 6/1989 |
| JP | 2-847 B | 9/1990 |
| JP | 09-275042 A | 10/1997 |
| JP | 10-121336 A | 5/1998 |
| JP | 11-067608 A | 3/1999 |
| JP | 2002-015958 A | 1/2002 |
| JP | 2002-083747 A | 3/2002 |
| JP | 2002-134369 A | 5/2002 |
| JP | 2003-086469 A | 3/2003 |
| JP | 2004-047613 A | 2/2004 |
| JP | 2004-067498 A | 3/2004 |

* cited by examiner

*Primary Examiner*—Eric W. Thomas
(74) *Attorney, Agent, or Firm*—Arent Fox, PLLC.

(57) ABSTRACT

An electric double layer capacitor has high static capacitance, and superior durability, and the amount of gas generated by dissociating solvent can be reduced. In an electric double layer capacitor including an anode and a cathode containing active carbon, a separator, and nonaqueous electrolyte solution, the crystallite thickness Lc(002) of the d002 plane of the active carbon used for the anode is set to be larger than the crystallite thickness Lc(002) of the d002 plane of the active carbon used for the cathode.

5 Claims, 2 Drawing Sheets

ELECTRIC DOUBLE LAYER CAPACITOR

BACKGROUND OF THE INVENTION

1. Field of the Invention

The present invention relates to an electric double layer capacitor using an active carbon.

2. Related Art

An electric double layer capacitor has a wide usable temperature range and high power density. In order to improve energy density, it is necessary to increase the use voltage of a capacitor with an active carbon. A method in which active carbon having high capacitance for electric double layer capacitors is produced by alkali-activating easily graphitized carbon material is known (Japanese Unexamined Patent Application Publication No. H9-275042). As exemplary methods for producing active carbon, alkali activation methods for carbon materials are known (Japanese Unexamined Patent Application Publications Nos. 2002-15958, 2002-134369, H1-139865, and H10-121336).

However, the alkali activated active carbons have problems in that durability in nonaqueous organic electrolyte solutions such as propylene carbonate (PC) solution is remarkably deteriorated, and in that large quantities of gas are generated by dissociating solvent. In particular, when voltage is raised by using an electrolyte solution which consists mainly of PC solution, the electrolyte solution is dissociated so as to generate gas and internal pressure in an aluminum case of the capacitor is increased, and many inconveniences thereby occur.

In addition, it is known that in durability tests for temperature and voltage load, characteristics are greatly deteriorated and resistance increase rate is increased when pore volume of the active carbon is 0.3 ml/g or less, and pore structures, surface states of carbon, ranges of low metal impurity amounts, and exemplary production methods thereof, which are suitable for improving the durability, have been reported (Japanese Unexamined Patent Application Publications Nos. 2002-83747, 2003-86469, 2004-47613, and 2004-67498).

Furthermore, it is known that in the electric double layer capacitor, stable high voltage resistance is obtained by using an anode and a cathode in which polarizing electrode amounts of each electrode differ (Japanese Unexamined Patent Application Publication No. S61-203614). However, when the electrode amount of the cathode is decreased, the capacitor is not useful since capacitance is reduced. In addition, as an active carbon for a polarizing electrode used in an anode and a cathode, carbon materials in which pore diameters differ are used in an anode and a cathode in order to increase capacitance have been proposed (Japanese Unexamined Patent Application Publication No. H11-67608); however, static capacitance is small and sufficient characteristics are not exhibited since the average of each pore diameter of the active carbon is 1.1 nm and 1 nm and the specific surface area is 1500 m²/g or more.

Therefore, in the electric double layer capacitor using conventional active carbon as described above, characteristics of static capacitance, internal resistance and dissociating of electrolyte solution are not sufficient, and further improvement of durability is required.

DISCLOSURE OF INVENTION

The present invention was completed in order to solve the above problems, and objects of the present invention are therefore to provide an electric double layer capacitor in which high static capacitance can be obtained, and moreover, durability is superior and amount of gas generated by dissociating solvent can be reduced.

The electric double layer capacitor 1 of the present invention includes an anode 4 and a cathode 5 containing active carbon, a separator 6, and nonaqueous electrolyte solution 7, as described in FIG. 1, in which the crystallite thickness Lc(002) of the d002 plane of the active carbon used in the anode is larger than the crystallite thickness Lc(002) of the d002 plane of the active carbon used in the cathode. In the present invention, the crystallite thickness Lc(002) of the d002 plane exhibits a graphite structure in a carbon lattice, and specifically, it is a value measured by a diffraction ray of the d002 plane in XRD measurement using CuK α-ray.

According to the present invention, by increasing the crystallite thickness Lc(002) of the d002 plane of the active carbon used in the anode to be larger than the crystallite thickness Lc(002) of the d002 plane of the active carbon used in the cathode, carbon-carbon bonds at the surface of the anode active carbon are stabilized, electrochemical oxidation dissociating of a carbon electrode is reduced, and reactivity on the interface of active carbon-electrolyte solution in the anode is reduced. As a result, leakage current is decreased, and the dissociated amount of carbonate solution, in particular PC solution, decrease at both the anode and the cathode. Effects in which static capacitance is further improved, internal resistance is further decreased, and generated amount of gas is further reduced, are thereby exhibited, since blockage of carbon pores by dissociated products of carbonate solution, in particular PC solution, decreases. This is effective for gas-activated active carbon such as steam-activated active carbon more than for alkali-activated active carbon in which porous surfaces easily form an edge plane, in particular alkali-activated active carbon consisting of easily graphitized carbon material.

This will be explained in more detail below. When Lc(002) increases, the dielectric constant of a carbon lattice is increased and in addition, carbon density per active carbon volume increases, so that capacitance density $F/cm^3$ can be increased. Furthermore, in this case, resistance of active carbon is also low, and this is preferable from the viewpoint of performance. However, when active carbon having high Lc(002) is used in both electrodes, initial performance can be improved; however, durability is reduced since PC reduction dissociation reactivity increases at active carbon pores inside of the cathode, and generated amount of gas, internal resistance, and capacitance decreasing rate increase. In contrast, when active carbon having small Lc(002) is used in both electrodes, durability can be improved; however, the capacitance decreases, and in addition, the generated amount of gas is increased.

BEST MODE FOR CARRYING OUT THE INVENTION

Figure 1:
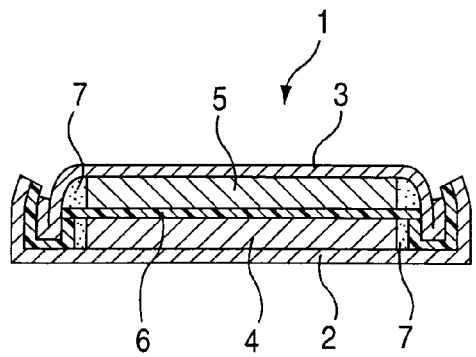
FIG. 1 is a sectional view showing one embodiment of an electric double layer capacitor according to the present invention.

The electric double layer capacitor 1 of the present invention includes an anode 4 and a cathode 5 consisting of active carbon, a separator 6, a and nonaqueous electrolyte solution 7 in a case 2 and a cover 3, as described in FIG. 1, and constituent materials and production methods known conventionally can be used. With respect to the active carbon used for the anode and the cathode, it is necessary that the crystallite thickness Lc(002) of the d002 plane of active carbon used for the anode be larger than the crystallite thickness Lc(002) of the d002 plane of active carbon used for the cathode. A crystal structure of carbon generally develops during heat treatment processes of carbonization and carbon activating. Therefore, the crystal structure of the active carbon can be controlled by selecting carbon material production conditions, activation methods, and activation conditions. As an active carbon used for an electric double layer capacitor, alkali-activated active carbons are preferable because of high capacitance. Of these, in order to obtain particularly high capacitance, alkali-activated active carbons using graphitized carbon material are preferable. In the following, the alkali-activated active carbons in the electric double layer capacitor of the present invention will be explained.

1. Carbon Raw Materials

In order to increase carbon crystallinity, raw material organic compounds which can produce easily graphitized carbon materials are desirable, and for example, synthetic, petroleum, or coal mesophase pitch; petroleum coke; coal coke; PVC pitch, etc., can be used. As production methods for alkali-activated active carbon, various methods are known, and are, for example, described in the above-mentioned Japanese Unexamined Patent Application Publications Nos. H9-275042, 2002-15958, 2002-134369, H1-139865, and H10-121336. In addition, in Examples according to the present invention described below, 100% optically anisotropic synthetic mesophase pitch was used as raw material; however, there is no restriction to use raw material organic compounds for forming the graphite structure.

Specifically, a method for improving crystallinity of a carbon lattice in an alkali-activated active carbon is as follows. Selecting of starting organic compounds, crystallinity of carbon material before activation, and degree of alkali-activation in a process for activating carbon, are important for controlling Lc(002). First, in order to produce an active carbon having a desired Lc(002) value and high capacitance, suitable starting organic raw materials, a suitable carbonization method, and suitable carbonization temperature are necessary, and in addition, it is necessary to adjust the KOH amount. Furthermore, when alkali activation progresses, porosity increases and crystallinity of the lattice deteriorates, and as a result, Lc(002) decreases. Therefore, in the present invention, it is preferable that true specific gravity of the graphitized carbon material, which is carbon precursor used for activating, be 1.40 to 1.80. In particular, it is preferable that true specific gravity of a carbon material for producing active carbon used for an anode be 1.50 to 1.70, and it is preferable that true specific gravity of a carbon material for producing active carbon used for a cathode be 1.40 to 1.55. When the true specific gravity is less than 1.40, Lc(002) can be set to be 0.3 nm or less by progressing activation reaction, and superior crystallinity can be formed. In contrast, when the true specific gravity exceeds 1.80, the activation reaction does not progress, and active carbon cannot be produced.

In addition, crystallinity of easily graphitized carbon material is controlled by controlling orientation of raw material organic material such as mesophase pitch. In order to produce active carbon having high crystallinity (Lc(002)), it is preferable that the d002 plane spacing of carbide which is an alkali activation raw material be 3.30 to 3.50 Å, and that Lc(002) be 1 to 4 nm. As a production method of such carbide, methods described in Isao Mochida, et al., Carbon 41 (2003) 397–403, and Japanese Unexamined Patent Application Publications Nos. 2003-45758 and 2003-282370 can be used.

In the active carbon used for an anode having high Lc(002), it is preferable that the specific surface area, micropore volume measured by a t-plot method, and average pore diameter be 100 to 800 $m^2/g$, 0.1 to 0.35 ml/g, and 0.7 to 0.9 nm, respectively. In addition, in the active carbon used for a cathode, it is preferable that the specific surface area, micropore volume measured by a t-plot method, and average pore diameter be 600 to 2500 $m^2/g$, 0.3 to 1.0 ml/g, and 0.85 to 15 nm, respectively. Here, the t-plot method is a method in which micropore volume and micropore area are measured (B. C. Lippens, and J. H. de Boer, J. Catalysis, 4, 319 (1965)). The present invention relates to a carbon lattice structure of active carbon in electrodes, and there are no differences or restrictions in porous structure, in particular, specific surface area and pore volume of active carbon at both electrodes, and it is not necessary to make the capacitances of the electric double layer in the anode and the cathode different.

In addition, in the present invention, the crystallite thickness Lc(002) of the d002 plane of alkali-activated active carbon used for the anode is preferably 1.1 nm or more, and is more preferably 1.1 to 4 nm. The Lc(002) of each of the raw material pitch, carbon raw material, and active carbon is preferably in the above range, since they tend to decrease in order of Lc(002) of raw material pitch>Lc(002) of carbon raw material>Lc(002) of alkali-activated active carbon, and Lc(002) of graphitized carbon material at 700 to 1000° C. is 4 nm or less.

2. Production Method

As a method for producing the active carbon in the present invention, well-known methods can be used; however, in the following, preferable conditions in each step of production of alkali-activated active carbon is explained.

(1) Carbonization Process

In the present invention, the carbonization process is carried out before the alkali-activation process. The carbonization process is carried out in an inert gas such as nitrogen, and the processing temperature is preferably 500 to 1,000° C. and is more preferably 600 to 900° C. When the carbonization temperature is less than 500° C., low volatile components cannot be sufficiently removed. In contrast, when it exceeds 1,000° C., a graphite structure of carbon raw material excessively develops, and progress of the following alkali-activation process is extremely slow, and as a result, long reaction time is necessary and the cost of the carbonization increases. Therefore, in applications except for special applications in which high conductivity is desired, the carbonization is preferably carried out at 1,000° C. or less, and is more preferably carried out at 900° C. or less. The carbonization process is completed in 1 to 4 hours.

(2) Crushing Process

It is necessary to crush raw carbon material in order to obtain powdered active carbon. The means for crushing in the present invention is not specifically limited, and for example, pole mills, jet mills, high-speed rotation mills, etc., can be used. In the alkali activation reaction, it is desirable that the powdered active carbon have uniform particle diameter, and that the particle diameter of the crushed carbon material be controlled by classifying. In addition, it is preferable that the average particle diameter of active carbon in the present invention be 1 to 30 μm.

(3) Alkali Activation Process

As an alkali metal compound used in the alkali activation process in the present invention, potassium hydroxide, sodium hydroxide, potassium carbonate, etc., may be mentioned, and of these, potassium hydroxide is particularly preferable. In addition, in activation reaction using the above carbon raw material suitable for the present invention, in view of the desired Lc(002), specific surface area, and micropore volume, content of alkali metal compound and temperature condition of activation reaction are finally set, and it is preferable that an alkali metal compound be used at 1.5 to 2.5 times by weight ratio to carbon raw material. When the amount of the alkali metal compound used is less than 1.5 times by weight ratio, efficiency of pore formation of produced active carbon tends to be reduced. In contrast, when it exceeds 2.5 times by weight ratio, further effect is not obtained and the cost of the subsequent processes such as neutralization is increased, and moreover, it is also not preferable from the viewpoint of maintenance and safety of equipment. Furthermore, the activation temperature is suitably 600 to 1,000° C., and it is preferably 700 to 850° C.

3. Other Components (1) Nonaqueous Electrolyte Solution

In the case in which solvent containing carbonate is mainly used, a problem of gas generation occurs, and therefore, in the present invention, it is preferable that the solvent be a nonaqueous electrolyte solution contain mainly carbonate. Specifically, cyclic carbonates such as ethylene carbonate, propylene carbonate, butylene carbonate, etc.; straight-chained carbonate such as dimethyl carbonate, ethylmethyl carbonate, diethyl carbonate, etc.; and mixed solvents thereof, can be used.

(2) Electrolyte

In the present invention, it is preferable that electrolytes have high solubility and contain anions having small ion diameter. Cations of the electrolyte are not limited to specific cations, and specifically, pyrrolidinium cations such as dimethylpyrrolidinium, methylethyl pyrrolidinium, etc.; quarternary ammonium cations; alkyl imidazoliums such as ethylmethyl imidazolium, etc.; and ionic solutions including alkoxyl group, can be used from the viewpoint of electrical conductivity, solubility, and electrochemical stability. In addition, as an anion, $BF_4^-$, $PF_6^-$, $CF_3SO_3^-$, $AsF_6^-$, $N(SO_2CF_3)^{2-}$, etc., can be used, and of these, $BF_4^-$ is preferable. It is preferable that concentration of salts in electrolyte solution be 0.8 to 6 mol/L, since the ion amount for forming an electric double layer is ensured and electrical conductivity is sufficiently obtained. These electrolytes can be used alone or in combination.

EXAMPLES

In the following, effects of the present invention will be explained in detail by Examples.

1. Production of Active Carbon

Active Carbon A

Synthetic mesophase pitch having a softening point of about 285° C. was put into a crucible made of alumina, and was put into a carbonization furnace in nitrogen at 750° C., and then carbide was taken out after 1 hour. The carbide was crushed by a ball mill, so that carbon powder having an average particle diameter D50=11 μm was prepared. True specific gravity of the carbon powder was measured by a butanol substitution method, and as a result, it was 1.50.

Next, 200 g of prepared carbon powder and 400 g (KOH/C=1.9) of potassium hydroxide pellets (purity: 95%) were mixed and put into a reactor vessel made of pure Ni, and were maintained in a nitrogen stream at 450° C. for 3 hours. Subsequently, the mixture was heated to 730° C. and was maintained at 730° C. for 3 hours, so as to carry out alkali activation, and thereby, active carbon was produced. Next, the active carbon was cooled to ordinary temperature, and was taken out, and it was cleaned with hot water at 90° C. Then it was cleaned with hydrochloric acid solution and was dried at 150° C., and therefore, Active Carbon A was produced.

Active Carbon B

Active Carbon B was produced in the same manner as that of Active Carbon A, except that 358 g (KOH/C=1.7) of potassium hydroxide pellets (purity: 95%) was used to 200 g of prepared carbon powder in an activation process of carbon powder.

Active Carbon C

Synthetic mesophase pitch having a softening point of about 280° C. was put into a crucible made of alumina, and was heated to 750° C. at a predetermined rate of 200° C./hr, and it was held at 750° C. for 1 hour, and then carbide was taken out. The carbide was crushed by a ball mill, so that carbon powder having an average particle diameter D50=11 μm was prepared. True specific gravity of the carbon powder was measured by a butanol substitution method, and as a result, it was 1.54. Next, using the prepared carbon powder, Active Carbon C was produced in the same manner as that of Active Carbon B.

Active Carbon D

Active Carbon D was produced in the same manner as that of Active Carbon C, except that a predetermined rate to 750° C. was changed to 50° C./hr in an activation process of carbon powder. With respect to carbon powder before activation in the Active Carbon D, true specific gravity was measured by a butanol substitution method, and as a result, it was 1.56.

Active Carbon E

Synthetic mesophase pitch having a softening point of about 280° C. was put into a crucible made of alumina, and was heated to 500° C. at a predetermined rate of 3° C./hr and to 750 at a predetermined rate of 200° C./hr, and it was maintained at 750° C. for 1 hour, and then carbide was taken out. The carbide was crushed by a ball mill, so that carbon powder having an average particle diameter D50=11 μm was prepared. True specific gravity of the carbon powder was measured by a butanol substitution method, and as a result, it was 1.59. Next, using the prepared carbon powder, Active Carbon E was produced in the same manner as that of Active Carbon B.

Active Carbon F

Active Carbon F was produced in the same manner as that of Active Carbon E, except that 378 g (KOH/C=1.8) of potassium hydroxide pellet (purity: 95%) was used to 200 g of prepared carbon powder and that heating at 730° C. for 3 hours was changed to heating at 800° C. for 3 hours in an activation process of carbon powder.

2. Physical Properties of Active Carbon

With respect to the above produced Active Carbons A to F, Lc(002), full width at half maximum (FWHM) of d002, specific surface area, pore volume, pore width, and functional group content were measured by the following methods, and the results are shown in Table 1.

(1) Lc(002) and FWHM

Lc(002) of active carbon was measured by an X-ray diffraction method, using an X-ray diffractometer (trade name: MXP 18, produced by MAC Science Co., Ltd.). An electrode sheet consisting of each active carbon, conductive agent, and PTFE binder was set in the diffractometer, and a diffraction pattern was measured under the following conditions by a step scanning method. Measuring range: 10 to 45 by 2θ; target: Cu; output: 40 kV, 100 mA; step width: 0.05 deg; and counting interval: 1.0 sec.

Next, analysis of the measured X-ray pattern was carried out under the following conditions by an analysis software (trade name: XPRESS Ver 1.0.3, produced by MAC Science Co., Ltd.). Noise processing condition: full width at half maximum 0.5 deg; noise level 5.0; and peak analysis differential point: 20.0.

With respect to Lc(002), a background line was drawn on the analysis pattern, and full width at half maximum (FWHM) was obtained by analysis of the above pattern. Calculation was carried out as follows.

Diffraction angle: 2θ on (002) plane of the carbon material was compensated by diffraction angle of (111) plane of silicon, and d(002) was calculated by the Bragg equation (1).

$$2d \sin \theta = \lambda \quad (1)$$

In addition, Lc was calculated by the Scherrer equation (2), using diffraction angle: 2θ on (002) plane and full width at half maximum: β of diffraction peak.

$$Lc = K\lambda/\beta \cos \theta \quad (2)$$

K was 0.9, and λ was 1.5405.

(2) Specific Surface Area, Pore Volume, and Pore Width

With respect to active carbon samples dried at 300° C. for 6 hours under vacuum, specific surface area, pore volume, and pore width were measured by a multipoint measuring method using a gas absorption method and by a t-plot method, using a nitrogen gas adsorption equipment (trade name: ASSP 2010, produced by Shimadzu Corporation).

(3) Functional Group Content 2 g of each active carbon sample was taken into a 100 ml Erlenmeyer flask, 50 ml of N/10 sodium ethoxide was added therein, and the mixture was shaken for 24 hours and was filtered. Subsequently, unreacted sodium ethoxide was titrated with N/10 hydrochloric acid, and therefore, the functional group content was determined.

TABLE 1

| Active Carbon | FWHM | 2θ | Lc(002) Å | Specific Surface Area m²/g | Pore Volume ml/g | Pore Width nm | Functional Group Content meq/g |
|---|---|---|---|---|---|---|---|
| A | 8.50 | 23.10 | 9.54 | 1560 | 0.60 | 1.1 | 0.98 |
| B | 7.90 | 23.10 | 10.26 | 1080 | 0.47 | 0.93 | 0.85 |
| C | 7.60 | 23.15 | 10.67 | 790 | 0.35 | 0.82 | 0.70 |
| D | 7.10 | 23.10 | 11.42 | 640 | 0.28 | 0.77 | 0.68 |
| E | 6.50 | 23.40 | 12.48 | 648 | 0.28 | 0.77 | 0.65 |
| F | 6.10 | 23.60 | 13.30 | 330 | 0.09 | 0.63 | 0.65 |

3. Production of Electric Double Layer Capacitor

Active Carbons A to F produced as described above, DENKA BLACK (conductive filler), and polytetrafluoroethylene: PTFE (binding agent) were mixed and kneaded so as to be 90:5:5 by weight ratio, and the kneaded mixture was rolled, and thereby, an active carbon electrode sheet having molding density of electrode of 0.6 to 1.0 g/cm³ and thickness of 140 μm was produced.

Example 1

Next, the above active carbon electrode sheet using Active Carbon D was adhered to both sides of a band-shaped collector consisting of aluminum foil, using conductive adhesive, and a sheet-shaped electrode for an anode was thereby produced. Similarly, the active carbon electrode sheet using Active Carbon C was adhered to both sides of a band-shaped collector consisting of aluminum foil, using conductive adhesive, and a sheet-shaped electrode for a cathode was thereby produced. Then, these sheet-shaped electrodes were laminated sandwiching a separator, and were rolled up, so as to produce an element. The element was inserted in an aluminum case having a diameter of 40 mm and a length of 120 mm, and a terminal area thereof was welded and was dried at 200° C. under a vacuum. Subsequently, propylene carbonate solution of 1.8 mol/L triethylmethylammonium tetrafluoroborate, $(C_2H_5)_3CH_3NBF_4$, which is an electrolyte solution, was injected in the inside of the aluminum case and was impregnated, and then, an electric double layer capacitor according to Example 1 of the present invention was produced by welding a sealing plate.

Examples 2 to 3 and Comparative Examples 1 to 8

Electric double layer capacitors of Examples 2 to 3 and Comparative Examples 1 to 8 were produced in the same manner as that of Example 1, except that active carbons used for an anode and a cathode were changed to active carbons of a combination shown in Table 2, in production process of a sheet-shaped electrode of Example 1.

4. Durability Evaluation

With respect to the electric double layer capacitors of Examples 1 to 3 and Comparative Examples 1 to 8 produced as described above, aging was carried out by applying a voltage of 2.7 V at 65° C. for 6 hours, and after cooling to room temperature (25° C.), 30 A constant-current discharge from 2.7 V was carried out, and initial static capacitance and internal resistance of the capacitor were measured by an energy conversion method.

Next, after measuring the initial static capacitance, durability test was carried out by applying a voltage of 2.7V for 1,000 hours in a constant temperature oven at 65° C. Cells of the capacitors after durability tests were cooled to 25° C., and static capacitance and internal resistance were measured, and then the change in rate of static capacitance after the durability test to initial properties were calculated by an energy conversion method. In addition, for cells in which, after durability tests, internal pressure was increased by generated gas, increased volume was measured when the internal pressure was lowered to atmospheric pressure by removing the gas inside the cell using a syringe, and the generated amount of gas was thereby determined. These results are shown in Table 2 and FIGS. 2 to 4.

TABLE 2

|  | Active Carbon | | Initial Properties | | After 1,000 Hours | | | |
|---|---|---|---|---|---|---|---|---|
|  | | | Static Capacitance | Internal Resistance | Static Capacitance | Internal Resistance | Generated Amount of | Changing Rate of |
|  | Anode | Cathode | F | mΩ | F | mΩ | Gas ml | Capacitance % |
| Example 1 | D | C | 2080 | 2.80 | 1914 | 4.06 | 33 | 92 |
| Example 2 | E | C | 2140 | 3.00 | 2012 | 4.35 | 31 | 94 |
| Example 3 | F | C | 2280 | 3.10 | 2143 | 4.50 | 29 | 94 |
| Comparative Example 1 | A | A | 1700 | 3.40 | 1445 | 4.93 | 50 | 85 |
| Comparative Example 2 | B | B | 1900 | 3.60 | 1653 | 5.22 | 50 | 87 |
| Comparative Example 3 | C | C | 2020 | 3.90 | 1798 | 5.66 | 50 | 89 |
| Comparative Example 4 | D | D | 2200 | 4.20 | 1760 | 6.09 | 55 | 80 |
| Comparative Example 5 | E | E | 2280 | 4.50 | 1687 | 6.75 | 60.5 | 74 |
| Comparative Example 6 | F | F | 2355 | 4.80 | 1649 | 7.20 | 72.6 | 70 |
| Comparative Example 7 | A | C | 1900 | 3.60 | 1615 | 5.22 | 50 | 85 |
| Comparative Example 8 | B | C | 1800 | 3.70 | 1742 | 5.37 | 50 | 88 |

Figure 2:
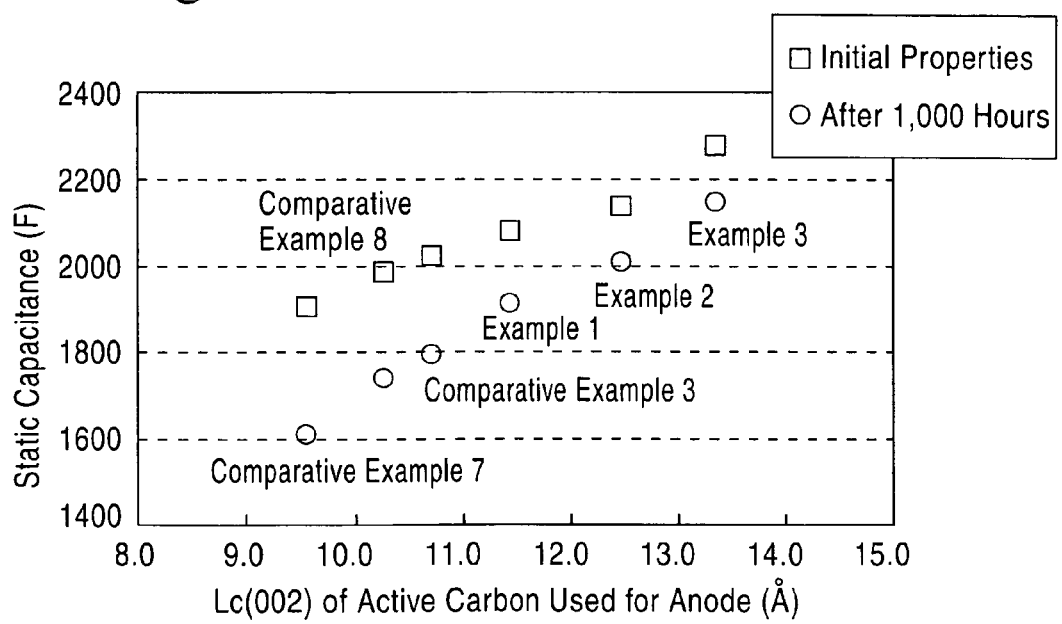
FIG. 2 is a diagram showing static capacitance versus Lc(002) of active carbon used for an anode.
Figure 3:
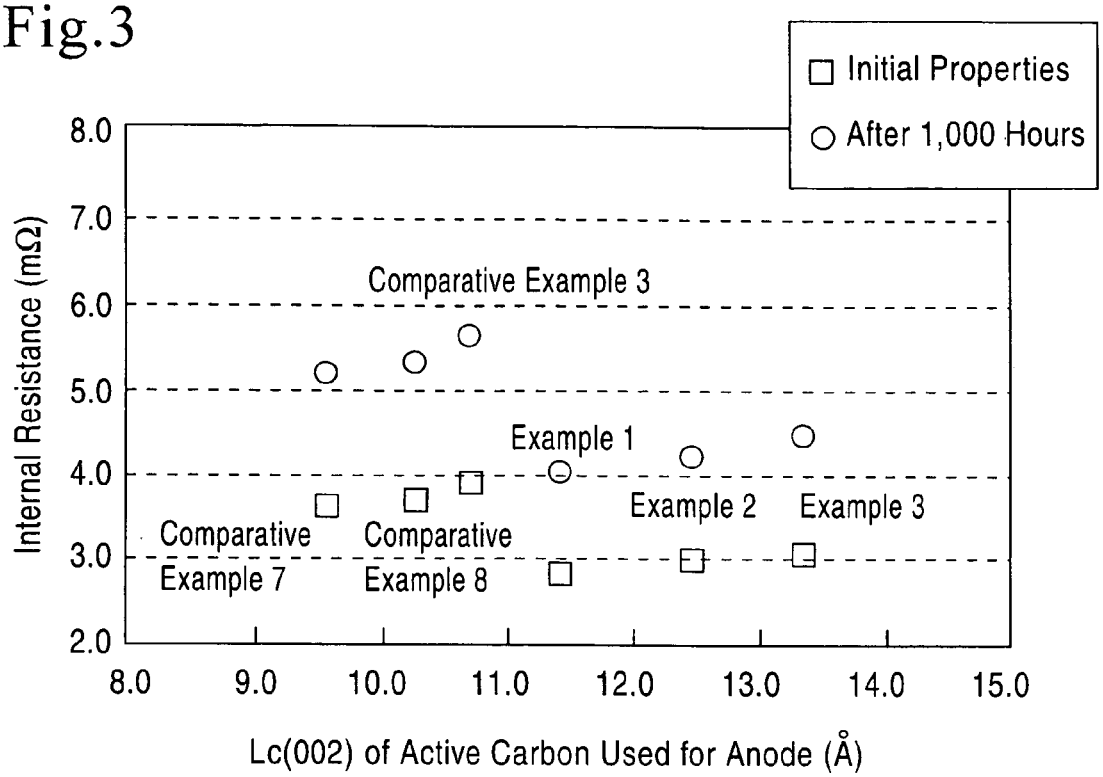
FIG. 3 is a diagram showing internal resistance versus Lc(002) of active carbon used for an anode.
Figure 4:
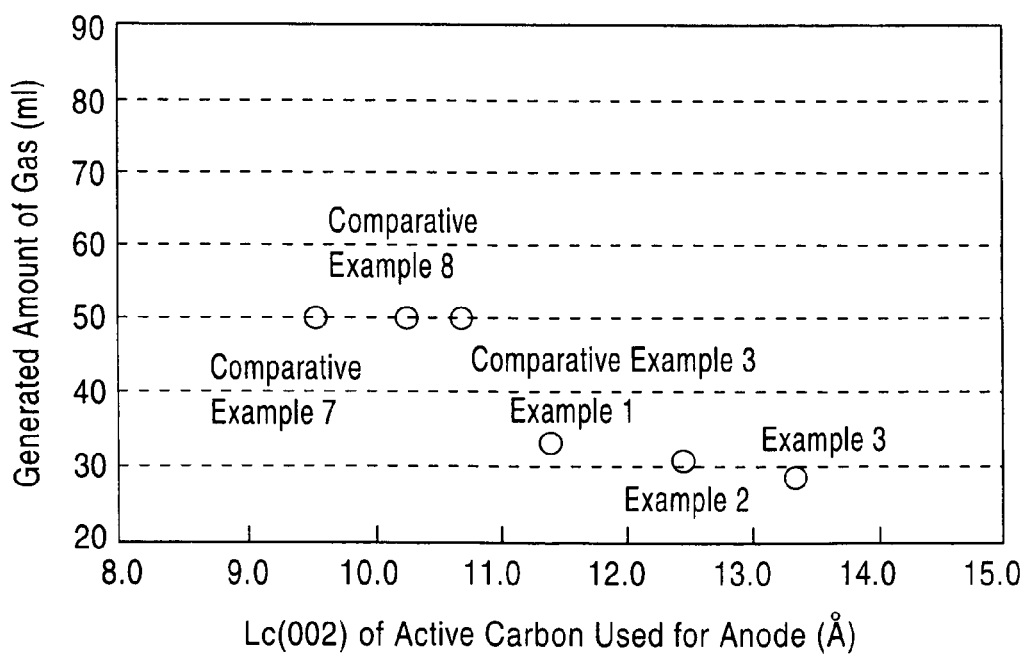
FIG. 4 is a diagram showing generated amount of gas versus Lc(002) of active carbon used for an anode.

As is apparent from Table 2 and FIGS. 2 to 4, in the electric double layer capacitors of Comparative Examples 1 to 6 in which the same active carbon was used in an anode and a cathode, or in the electric double layer capacitors of Comparative Examples 7 and 8 in which Lc(002) of active carbon used for an anode was smaller than Lc(002) of active carbon used for a cathode, the static capacitance and internal resistance were changed, and 50 ml or more of gas was also generated, after the durability test for 1,000 hours.

In contrast, in the electric double layer capacitors of Examples 1 to 3 in which the Lc(002) of active carbon used for the anode was larger than the Lc(002) of active carbon used for the cathode, static capacitance and internal resistance were slightly changed and very little gas was generated, even after the durability test for 1,000 hours. Therefore, according to the electric double layer capacitor of the present invention, high static capacitance was obtained, and moreover, durability was superior and the amount of gas generated by dissociating solvent was reduced.

What is claimed is:

1. An electric double layer capacitor comprising an anode and a cathode comprising active carbon, a separator, and nonaqueous electrolyte solution as a solvent, wherein crystallite thickness Lc(002) of a d002 plane of the active carbon used for the anode is larger than the crystallite thickness Lc(002) of the d002 plane of the active carbon used for the cathode.

2. The electric double layer capacitor according to claim 1, wherein the crystallite thickness Lc(002) of the d002 plane of the active carbon used for the anode is 1.1 nm or more.

3. The electric double layer capacitor according to claim 1, wherein the nonaqueous electrolyte solution primarily comprises carbonate solution.

4. The electric double layer capacitor according to claim 1, wherein the active carbon is alkali-activated active carbon.

5. The electric double layer capacitor according to claim 4, wherein the alkali-activated active carbon is easily graphitized alkali-activated active carbon.

* * * * *